United States Patent [19]
Boyle et al.

[11] Patent Number: 4,728,154
[45] Date of Patent: Mar. 1, 1988

[54] BALANCE WEIGHT FOR VEHICLE WHEEL

[75] Inventors: Brendan J. Boyle, Menlo Park, Calif.; James M. Kutt, Lansing, Mich.

[73] Assignee: Motor Wheel Corporation, Lansing, Mich.

[21] Appl. No.: 10,697

[22] Filed: Feb. 4, 1987

[51] Int. Cl.$^4$ .............................................. B60B 13/00
[52] U.S. Cl. .................................................... 301/5 B
[58] Field of Search ...................... 301/5 R, 5 B, 63 R

[56] References Cited

U.S. PATENT DOCUMENTS 3,357,750  12/1967  Reynolds et al. ................. 305/58 R

FOREIGN PATENT DOCUMENTS 1087030  11/1955  Fed. Rep. of Germany ...... 301/5 B

Primary Examiner—David A. Scherbel
Attorney, Agent, or Firm—Barnes, Kisselle, Raisch, Choate, Whittemore & Hulbert

[57] ABSTRACT

A balance weight for balancing first and second sizes of automobile wheels of the type having a tire rim of a given size range and having a generally radially extending tire bead retaining flange portion terminating in a generally axially outwardly extending flange portion. The balance weight body has first and second faces shaped to fit against the outboard corner of the different size rim flange portions. A weight attachment clip is cast into the body and has oppositely disposed first and second legs protruding from the body faces. The first leg projecting defines a predetermined first clearance space between it and the first body face adapted to provide an attachment fit with the first size range tire rim. The second leg defines a second predetermined clearance space between it and the second body face selected for fitting said balance weight to the second size range wheel rim flange portions. The body has first and second recesses formed one in each of its first and second faces adapted to respectively receive therein the first and second clip legs in a deformed condition thereof when the same is unused for installation of said balance weight.

11 Claims, 3 Drawing Figures

BALANCE WEIGHT FOR VEHICLE WHEEL

This invention relates to balance weights for wheels, particularly automobile wheels, of the type including a block-like oblong body of predetermined mass which is mounted and maintained in engagement on the rim of the wheel to be balanced under the gripping action of clip or prong which extends from the body so as to embrace the wheel rim flange.

Prior known wheel balance weights of the aforementioned type typically are made to closely follow the contour of the wheel rim flange, and, in a cross-section in a radial plane, the profile of the weight engages the outboard profile of the rim flange along a substantial part thereof. The clip of the balance weight is typically deformed by a pliers-like installation tool so as to wrap around the outer edge of the rim flange and rest against the tire-bead-seating side of the flange. Due to differences in rim flange contour, wheel diameter and rim flange cross-sectional dimensions from one wheel to another, it has often been necessary to provide a specific pattern and design of wheel weight for each type of rim. For example, two widely different types of automobile passenger vehicle wheels are currently made by the assignee of the present application, Motor Wheel Corporation of Lansing, Michigan. One type is a so-called "standard" steel wheel typically having a rolled rim with both inboard and outboard tire-bead-retaining rim flanges of a given contour and cross-sectional thickness, one example of this type of wheel rim being shown in U.S. Pat. No. 4,279,287, issued July 21, 1981 to Daudi, Golata and Triponi and assigned to the assignee herein. The other type is a so-called "full face wheel" wherein the rim tire-bead-retaining flange contour and thickness dimension have been materially altered from those of the standard wheel rim. One example of such a "full face" wheel and rim is shown in U.S. Pat. No. 4,610,482 issued Sept. 9, 1986 to Overbeck, Lawrence and Golata, and assigned to the assignee herein. Prior to the present invention, two different wheel weights have been required on the automobile production line when the aforementioned standard and full face wheels were installed on vehicles because the full face outer flange is too large in cross-sectional thickness to accommodate the smaller standard wheel balance weight. Accordingly, a need has arisen for a "universal" balance weight to accommodate the different gage thicknesses on these two rim flanges, as well as other wheel designs.

Although there have been prior efforts to provide a so-called "universal" balance weight to fit many different wheel types having rims of varying profile, such as those shown in U.S. Pat. Nos. 3,336,083 to Chatain and 3,495,877 to Morne, the solutions provided by these patents are less than ideal for the purposes of overcoming the aforecompanying standardization problem.

The balance weight of the Chatian Patent has large and small radii in the cross-sectional contour of the weight body, which is made of a malleable antimony-lead alloy composition, and is retained on a wheel rim by a spring clip of generally C-shaped configuration in cross-section and made of resilient material, presumably spring steel or the like. The configuration of the weight body as well as the resilience of the clip are stated to enable it to conform to mounting on a variety of rim edge profiles as well as rim cross-sectional thicknesses.

The Morne patent discloses a wheel balance weight formed of a body 10 of lead alloy combined with a spring clip 11, in this case cast into body 10. Body 10 has projections 14 which can be abraided off, i.e. filed away, to vary the space 13 between the spring clip and body to fit various rim thicknesses. In the embodiment of FIG. 3, the end 15 of the spring clip embedded in body 10 projects from the body opposite to the free end of clip 11 to provide a spring action therebetween to accommodate different rim thicknesses.

In both of the aforementioned prior art patents, in order to obtain "universality", it is necessary to utilize spring steel in the clip material, which is expensive and difficult to work with, subject to excessive corrosion and possibly requiring heat treat during manufacture to maintain its properites. These balance weights also are not adatped for use with the current attachment tools and equipment which contemplate bending and deforming a much more malleable low carbon clip into place over the rim edge to provide the proper rim holding action for the balance weight. It is also undesirable and costly to require manual fit modification of the weight, as by filing or abraiding the same.

Accordingly, among the objects of the present invention are to provide an improved balance weight for a vehicle wheel, particularly automotive passenger vehicle wheels, which can be provided in one standard size and design weight can be used for many different wheel types and flange sizes, thereby greatly reducing the number of different sizes and designs of such weights both in manufacturing and in after market repair shop inventories.

Another object is to provide an improved wheel balance weight of the aforementioned type which overcomes the aforementioned disadvantages inherent in previously known balance weights, which is more universally useful and inexpensive, and which is installable with present balance weight installation and attachment tools and equipment.

In general, the invention contemplates an improved wheel balance weight which incorporates the ability to be used on a thick or thin rim flange of a passenger car wheel. The balance weight of the invention utilizes an invertable double-type clip with two different radii and attachment clearances which allows the weight in either attachment position to fit properly under the rim flange of the wheel. Two projecting clip legs are provided on the body, one juxtaposed on each of the convex sides of the radii, with a throat size such that each will fit its respective size flange. The unused clip in either of the stated cases can be moved down into a recess in the body of the weight so that the same is permanently tucked away flush with or recessed from the body surface.

The invention, along with further objects, features and advantages of the same, will become more apparent from the following detailed description taken in conjunction with the accompanying drawings wherein.

Figure 1:
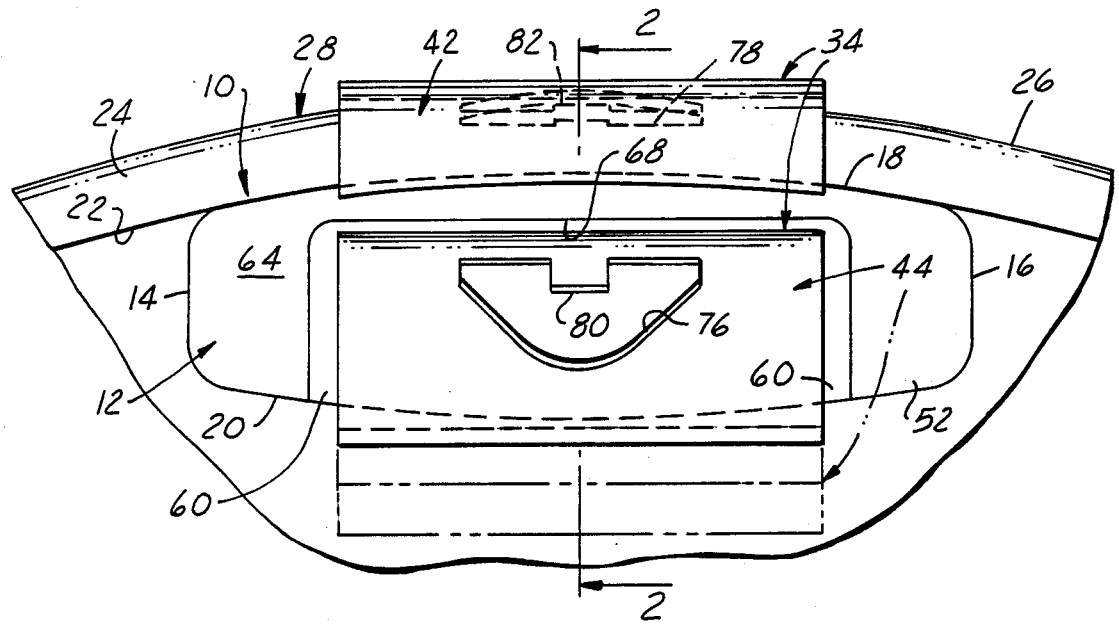
FIG. 1 is a fragmentary elevational view looking at the outboard side of a portion of a wheel rim flange of a "standard" passenger vehicle wheel, with an exemplary but preferred embodiment of a wheel balance weight of the invention installed on the rim flange.
Figure 2:
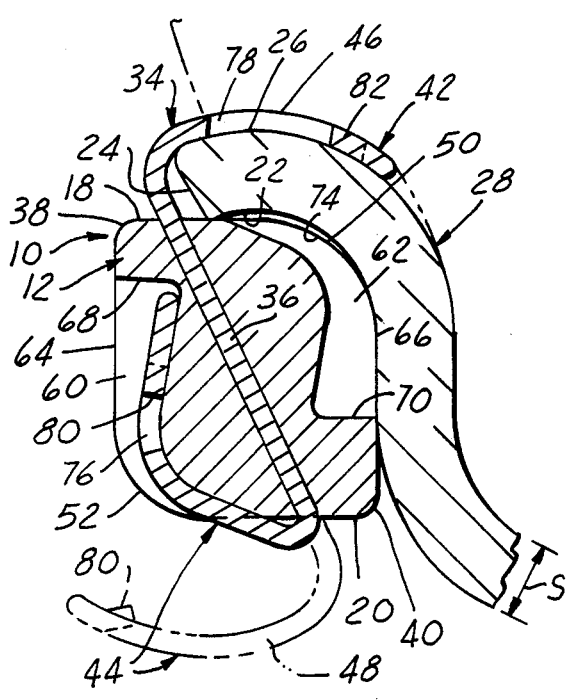
FIG. 2 is a radial cross-section view taken on the line 2—2 of FIG. 1.
Figure 3:
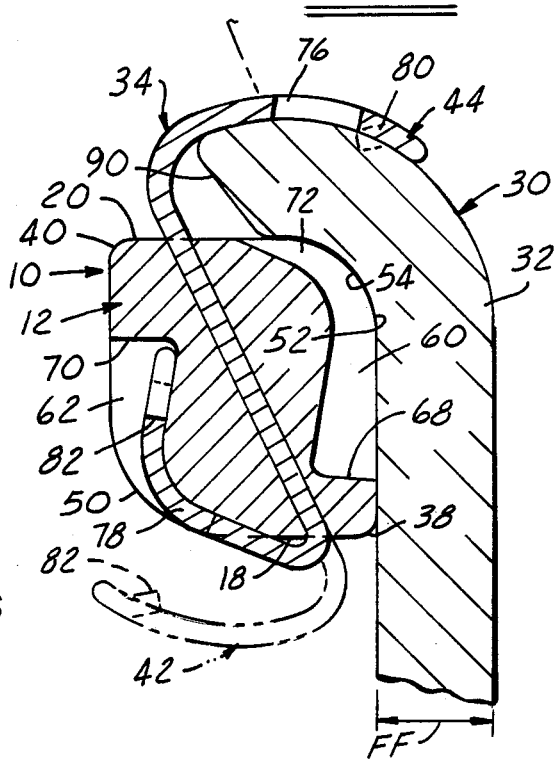
FIG. 3 is a cross-sectional view similar to that of FIG. 2 illustrating the same balance weight inverted and installed on a thicker rim flange of differing contour, such as that found on a "full face" passenger vehicle wheel.

The preferred embodiment of a balance weight 10 of the present invention comprises a block-like oblong body 12 which, as best seen in FIG. 1, is squared off at its opposite longitudinal ends 14 and 16 and has convex upper and lower surfaces 18 and 20 of the same radius of curvature. Surfaces 18 and 20 are curved to match the median radius of curvature (wheel diameter) of the inner surface 22 of the outboard edge 24 of a tire-bead-retaining flange 26 of a standard wheel rim 28 (FIGS. 1 and 2) as well as that of a full face wheel rim 30 (FIG. 3). It is to be understood that rim 28 of FIGS. 1 and 2 is of generally conventional contour in profile (FIG. 2) and has a cross-sectional thickness "S" which varies only a few thousands of an inch when employed in wheels having diameters ranging from 13 to 16 inches. However the "full face" wheel rim 30 shown in cross-section in FIG. 3 has a tire bead retaining flange 32 of greater cross-sectional thickness "FF", which may be in the order of 0.200 inches as compared to dimension "S", which may be in the order of 0.125 inches. This difference in stock thickness, as well as the differing cross-sectional contour (as will be evident from viewing FIG. 2 versus FIG. 3) represents a gross variation which is difficult if not impossible to accommodate in a reliable and economical manner with the so-called "universal" balance weights of the prior art.

In accordance with a principal feature of the present invention, balance weight 10 is well adapted to accommodate such gross variations due to the provision of a dual size retaining clip member 34. Clip 34 comprises a strip of low carbon mild steel initially blanked and punched from flat strip stock and then formed into a generally "S"-shaped cross-sectional configuration. Clip 34 as thus preformed is inserted into the mold cavity in which body 12 is to be cast, and therein the same is engulfed by the molten balance weight body material, such as the aforementioned lead-antimony alloy.

Referring in more detail to FIGS. 1 and 2, clip 34 has a width dimension about three fifths the longitudinal dimension of weight 12, and a length dimension which is approximately three times the distance viewed vertically in FIG. 1 between the top and bottom faces 18 and 20 of body 12. The central portion 36 of strip 34 is flat and may be imperforate or provided with anchoring holes as desired. The clip 34 preform is positioned in the weight casting mold so that portion 36 extends at an angle of about 60° to 65° relative to the flat portions of body faces 18 and 20 (FIG. 2) and such that it protrudes from body faces 18 and 20 relatively closely adjacent the generally square corner edges 38 and 40 of these surfaces. One end of clip 34 is fashioned into a reversey curved leg 42 adapted for attachment to the standard rim flange 28, whereas the other end of clip 34 is fashioned into an attachment leg 44 having a reverse curvature, as shown in phantom in FIG. 2, adapted for attachment to the full face rim flange 30 of FIG. 3. This is accomplished primarily by varying the clearance space between body face 18 and the crown portion 46 of leg 42 versus the clearance space between body face 20 and the crown portion 48 of leg 44 when initially positioning clip 34 in the mold and embedment of the clip in body 12 during casting. In addition, body 12, at the longitudinally extending corner edges thereof juxtaposed diagonally opposite the corner edges 38 and 40, is provided with rounded off corner edges 50 and 52 which cooperate with the respectively adjacent clip leg 42 and 44 to provide best fit with the standard rim flange 28 and full face rim flange 30 respectively. Thus, edge 50 has a larger radius of curvature than the diagonally opposite edge 52 to better conform with the outside undersurface 22 of rim flange 28 (FIG. 2), whereas body corner surface 52 has a smaller radius of curvature to fit the curvature of the outside undersurface 54 of the full face rim flange 30.

In accordance with another feature of the present invention, body 12 is provided with a pair of recesses or cavities 60 and 62 formed in the respectively opposite side faces 64 and 66 of body 12 adapted to respectively receive legs 44 and 42 in the unused condition thereof. Thus, referring to recess 60 as seen in FIGS. 1 and 2, the same is made slightly longer than the width of clip 34, as is recess 62, and the upper edge 68 of recess 60 is disposed closer to top face 18 of body 12 than the corresponding edge 70 of recess 62 is to bottom face 20 of body 12 such that recess 60 can accommodate longer leg 44 when folded thereinto as compared to recess 62 accommodating shorter leg 42. Each recess 60 and 62 is formed with an entrance portion 72 and 74 respectively inclined to, and opening into the associated body face 20 and 18 respectively.

In accordance with conventional balance weight attachment practice, each leg 42 and 44 of clip 34 has a die stamped opening 76 and 78, respectively formed therein, with respective holding tangs 80 and 82 projecting rearwardly from the central portion of the outer edge of each opening and initially bent slightly inwardly from the plane of the associated leg toward the central portion 36 of the clip (as best seen in phantom showing of legs 44 and 42 in FIGS. 2 and 3, respectively).

In the installation and use of balance weight 10 on a standard rim flange 28, weight 10 is fitted up against the underside of the rim flange to slip the outer end 24 of the rim flange into the throat space between leg 42 and body surface 50. The rim flange edge is fully inserted into this clearance space so as to bring the rounded face 50 of the body snugly against surface 22, which is the position of weight 10 shown in FIGS. 1 and 2. Preferably this clearance space is dimensioned to provide a slight interference fit with the faces 22 and 26 of flange 28 such that, as the weight 10 is moved into installed position, leg 42 is forced slightly farther away from central portion 36 of the clip 34 so that in installed position leg 42 has a press fit onto the rim flange to retain body 12 snugly against rim under surface 22. Alternatively, a slip-on clearance can be provided between leg 42 and body surface 50 relative to the rim flange edge and then, when body 12 is fully abutted beneath the rim flange edge, the usual balance weight attachment pliers or crimping tool may be employed to bend down leg 42 against the top surface 26 of rim flange 28 to provide the final force fit of the weight onto the rim flange in fully assembled condition. In either case, the initially bent down tab 82 will tend to dig into surface 26 to help resist retrograde slip-off motion of the balance weight.

After balance weight 10 has thus been firmly attached to rim flange 28, the unused clip leg 44 is bent from its phantom line position shown in FIG. 2 upwardly into the cavity-seated position thereof shown in solid lines in FIG. 2, leg 44 thereupon being substantially fully recessed within the outer dimensional contours of body 12. This deformation of the unused leg 44 can be readily accomplished using the same installation crimping tool customarily used when attaching conventional balance weights. Indeed the jaws of this crimping tool may be used to simultaneously embrace clip legs 42 and 44 therebetween so as to simultaneously force leg 42 snugly against flange surface 26 and likewise body 12 against flange surface 22 as leg 44 is crimped up into its cavity 60.

When balance weight 10 is to be installed on a "full-face" wheel rim flange 30 as shown in FIG. 3, the balance weight is inverted from the position thereof shown in FIG. 2. Then the end edge 90 of rim flange 30 inserted into the throat space defined between leg 44 and body surface 52 to bring the balance weight to the fully seated and installed position thereof shown in FIG. 3. Leg 44 again may either have a slight interference fit or a slip clearance fit as described previously with leg 42. In either event, the installation procedure is identical with the full face rim flange 30 as with the standard rim flange 28, i.e., again the crimping tool is used to bring the unused clip leg, in this case leg 42, up into its deformed and seated position recessed into its associated body cavity 62 as shown in the solid line position of leg 42 in FIG. 3.

From the foregoing description, it will now be apparent that the balance weight 10 of the present invention provides several advantages over the prior art "universal" balance weights as well as obtaining the desired standardization and reduction in the number of sizes of balance weights having different clips adapted to fit different wheel types and rim flange sizes. The body 12 of weight 10 essentially retains the overall shape of prior balance weights, and is installed and fitted in the same manner so that no modification in equipment is needed to use balance weight 10 as contrasted to conventional balance weights now in use. The attachment procedure for balance weight 10 is essentially the same as that now customarily employed, with the exception of the deformation and bending of the unused leg into its associated body recess. However, as indicated previously, this additional step can be accomplished in the same installation manipulation action with the attachment tool, if desired. Hence little or no re-training is required. The material of clip 34 may be the same inexpensive, mild low carbon steel now employed in single leg clips, thereby avoiding the expensive material and production problems encountered with the spring steel clilps of the aforementioned "universal" balance weights of the prior art. Indeed, the more malleable and more readily cold-worked low carbon steel material is best adapted for the deformation of the unused leg. Clip 34 need not be heat treated after casting of the same into the lead-antimony alloy material of body 12 since its resilience or spring back properties are not critical to the application. In the installed condition of balance weight 10, the outer dimensional contours of body 12 are essentially unchanged due to the recessed position of the unused clip leg in the body cavity. Hence balance weight 10 does not create any additional clearance problems with wheel covers or trim rings as compared to prior conventional balance weights.

From the foregoing description, it will be appreciated that the preferred embodiment of the balance weight 10 described and illustrated herein amply fulfills the aforementioned objects of the invention. However, it will be realized that variations of the inventive concept will occur from the foregoing disclosure to those skilled in the art. Therefore, the invention should not be considered limited to the preferred embodiment described above and shown in the drawings, but can be modified in various ways within the scope of the appended claims and applicable prior art.

We claim:

1. A balance weight for balancing first and second sizes of automobile wheels of the type having a tire rim of a given size range and having a generally radially extending tire bead retaining flange portion terminating in a generally axially outwardly extending flange portion, said balance weight comprising a body of heavy metallic material having first and second faces one of which is shaped to fit against the outboard corner of said rim flange portions, and a weight attachment clip cast into said body and having oppositely disposed first and second legs protruding from said first and second body faces, said first leg projecting from said first body face to define a predetermined first clearance space between said first leg and said first body face adapted to provide an attachment fit with said first size range tire rim, said second leg projecting from said second body face to define a second predetermined clearance space between said second leg and said second body face, said second clearance space being selected for fitting said balance weight to said second size range wheel rim flange portions.

2. The balance weight as set forth in claim 1 wherein said attachment clip has a generally S-shaped cross-sectional contour in the initially cast condition of said balance weight prior to installation thereof on a wheel rim, said clip having a straight central portion embedded in said body and extending there across, said clip having curved crowns defining each of said first and second legs thereof, said first and second faces of said body having curved edges running longitudinally thereof juxtaposed to the associated clip legs in generally parallel relation thereto for insertion of an axial extending flange portion of the associated rim size therebetween, said body curved edges being contoured for best conformance fit with the associated rim flange stock thickness size to be inserted between the associated clip leg and body edge.

3. The balance weight set forth in claim 1 wherein said body has first and second recesses formed one in each of said first and second body faces, said first recess being adapted to receive therein said first clip leg in a deformed condition of said first leg when the same is unused for installation of said balance weight, said second recess being similarly adapted to receive said second leg when deformed thereinto when the same is unused for installation of said balance weight.

4. The balance weight as set forth in claim 1 wherein said balance weight body is cast from a lead-antimony alloy and said attachment clip is a sheet steel stamping made of low carbon, mild steel.

5. The balance weight as set forth in claim 1 wherein said legs of said clip are each provided with an aperture having a retaining tang formed therein to serve as a retention barb in the installed condition of said leg with respect to its associated size wheel rim flange.

6. The balance weight as set forth in claim 1 wherein said legs of said attachment clip extend in opposite directions relative to one another, said first and second body faces defining opposed faces of said body.

7. A balance weight for balancing automobile wheels of the type having a tire rim with a generally radially extending tire bead retaining flange terminating in a generally axially outwardly extending flange, said balance weight comprising a body of heavy metallic material shaped to fit against the outboard corner of said radial and axial wheel flanges, and a weight attachment clip cast into said body and having oppositely disposed first and second legs protruding diagonally oppositely respectively from opposite first and second faces of said body, said first leg projecting from said first face of said body a shorter distance than said second leg from said second body face to respectively define first and second predetermined clearance spaces between said legs and the associated juxtaposed face of said body, the first clearance space being smaller than the second clarance space, said first and second clearance spaced being respectively selected for fitting said balance weight to two different stock thicknesses of said wheel rim flanges.

8. The balance weight as set forth in claim 7 wherein said attachment cllip has a generally S-shaped cross-sectional contour in the initially cast condition of said balance weight prior to installation thereof on a wheel rim, said clip having a straight central portion embedded in said body and extending generally diagonally there across as viewed in cross-section, said clip having curved crowns defining each of said first and second opposite legs thereof, said body having diagonally opposed first and second curved edge surfaces running longitudinally thereof juxtaposed to the associated clip legs in generally parallel relation thereto for insertion of an axial extending flange of the rim therebetween, said body curved surfaces being contoured for best conformance fit with the selection rim flange stock thickness to be inserted between the associated clip leg and body surface.

9. The balance weight set forth in claim 8 wherein said body has a pair of recesses, one formed in each of said opposite edge surfaces thereof, said recesses being respectively adapted to receive therein said first and second clip legs in a deformed condition thereof when the same in unused for installation of said balance weight.

10. The balance weight as set forth in claim 9 wherein said balance weight body is cast from a lead alloy and said clip is a sheet steel stamping made of low carbon, mild steel.

11. The balance weight as set forth in claim 9 wherein said legs of said clip extend in opposite directions relative to one another from generally opposite corners of said opposite faces of said body.

* * * * *